United States Patent
Manabe et al.

(10) Patent No.: US 7,311,517 B2
(45) Date of Patent: Dec. 25, 2007

(54) MOLD CLAMPING DEVICE AND MOLDING METHOD

(75) Inventors: Junji Manabe, Yamaguchi-ken (JP); Tsukasa Kato, Aichi-ken (JP); Yoshiki Matsuura, Aichi-ken (JP); Hidenori Uebayashi, Aichi-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 32 days.

(21) Appl. No.: 10/578,366

(22) PCT Filed: Nov. 9, 2004

(86) PCT No.: PCT/JP2004/016917

§ 371 (c)(1),
(2), (4) Date: May 5, 2006

(87) PCT Pub. No.: WO2005/046961

PCT Pub. Date: May 26, 2005

(65) Prior Publication Data

US 2007/0085238 A1    Apr. 19, 2007

(30) Foreign Application Priority Data

Nov. 13, 2003    (JP)    ............................. 2003-383811

(51) Int. Cl.
*B29C 45/67*    (2006.01)

(52) U.S. Cl. .................... 425/595; 264/328.1; 264/334; 425/451.9

(58) Field of Classification Search ................ 425/595, 425/451.9; 264/319, 328.1, 334
See application file for complete search history.

(56) References Cited

U.S. PATENT DOCUMENTS

| | | | | |
|---|---|---|---|---|
| 3,465,387 A | * | 9/1969 | Allard et al. ................ | 425/590 |
| 3,801,256 A | * | 4/1974 | Farrell ......................... | 425/595 |
| 4,504,208 A | * | 3/1985 | Kurumaji et al. ........... | 425/595 |
| 4,874,309 A | * | 10/1989 | Kushibe et al. ............. | 425/595 |
| 5,192,557 A | * | 3/1993 | Hirata et al. ................ | 425/595 |
| 5,338,171 A | * | 8/1994 | Hayakawa et al. ......... | 425/595 |
| 5,853,773 A | * | 12/1998 | Choi ........................... | 425/595 |

FOREIGN PATENT DOCUMENTS

| | | | |
|---|---|---|---|
| JP | 6-285931 | * | 10/1994 |
| JP | 8-72113 | * | 3/1996 |

* cited by examiner

*Primary Examiner*—James R Mackey
(74) *Attorney, Agent, or Firm*—Finnegan, Henderson, Farabow, Garrett & Dunner, LLP

(57) ABSTRACT

A movable platen (4) capable of advance and retraction with respect to a fixed plate is provided with a tie bar connecting device (12) for meshing a split nut (18) with the multiple groove portion (16) of a tie bar (10), and a mold clamping cylinder (20) operable with the split nut (18) serving as a reaction force point. The mold clamping cylinder (20) comprises a primary piston (22) contacting the split nut (18) and a secondary piston (24) movable relative to the primary piston (22). It is arranged that the movable platen (4) is stopped just before the position at which the movable mold contacts the fixed mold, and in this state the split nut (18) is reliably meshed with the multiple groove portion (16). Thereafter, the secondary piston (24) and primary piston (22) are moved integrally with respect to the movable platen (4) so as to effect mold contacting and mold clamping. After molding, the secondary piston (24) and the primary piston (22) are relatively moved to effect mold release.

3 Claims, 4 Drawing Sheets

MOLD CLAMPING DEVICE AND MOLDING METHOD

TECHNICAL FIELD

The present invention relates to a mold clamping device that is applied to a die casting machine, an injection molding machine, or the like, and also relates to a molding method in which the mold clamping device is used.

BACKGROUND ART

Generally speaking, conventional die casting machines and injection molding machines include a stationary platen that supports a stationary mold, a movable platen that supports a movable mold, and a supporting stage. The two ends of each of a plurality of (normally four) tie bars that extend through the movable platen are connected to the stationary platen and the supporting stage respectively. In the conventional machines, the mold closing process and the mold clamping process are performed by moving the movable platen toward the stationary platen side along the tie bars, using a mold clamping mechanism provided between the supporting stage and the movable platen.

With regard to the mold clamping mechanism, a toggle mold clamping mechanism has been popularly used in large die casting machines and injection molding machines, because it provides a strong mold clamping force that can withstand a large internal mold pressure. However, the toggle mold clamping mechanism has the problem where not only the parts (for example, a link) that structure the toggle mechanism are complicated and large-sized, but also the mechanism requires a large installation space because a long-stroke mold clamping cylinder needs to be used.

To cope with this problem, a mold clamping device using a tie-bar direct pressure method by which a mold clamping force is generated via the tie bars has been developed and put into use. Some mold clamping devices of this type have a structure in which one end of each of tie bars is directly connected to a ram (a piston) inside a hydraulic cylinder (a mold clamping cylinder) provided on the back of a stationary die plate (a stationary platen) (See Japanese Patent Application Publication No. 2001-1381). These days, however, attention is focused on a mold clamping device in which the tie bars can be removed, for the purpose of also improving the efficiency in the mold changing process.

A mold clamping device in which the tie bars can be removed according to a conventional technique is disclosed in Japanese Patent Application Publication No. H8-72113, for example. This device includes a stationary platen that supports a stationary mold, a movable platen (a movable die plate) that supports a movable mold, a plurality of tie bars with ends that are detachably connected to the stationary platen and other ends that extend through the movable platen, mold opening and closing means that moves the movable platen toward and away from the stationary platen so that the movable mold opens from and closes on the stationary mold, tie bar connecting means that detachably connects each of the plurality of tie bars to the movable platen by having a split nut engaged with an engagement portion formed in each of the tie bars, and a mold clamping cylinder that is provided around a tie bar insertion through hole in the movable platen and propels the movable platen toward the stationary platen side, using the split nut included in the tie bar connecting means as a reaction point, so as to generate a mold clamping force. According to the mold clamping device disclosed in the Japanese Patent Application Publication No. H8-72113, because the mold clamping cylinder is incorporated into the stationary platen, the size of the whole device is compact, and also, it is possible to remove the tie bars from the stationary platen by operating the mold opening and closing means after the fixation of the tie bars to the stationary platen is released.

According to the mold clamping device disclosed in the Japanese Patent Application Publication No. H8-72113, however, the tie bars are connected to the movable platen by the tie bar connecting means, after the movable platen is moved by the mold opening and closing means until the movable mold is in contact with the stationary mold. Thus, in the case where the thickness of the mold changes due to a change in the mold temperature, a problematic situation is often experienced where the split nut included in the tie bar connecting means cannot be engaged with the engagement portion of the tie bar. In particular, when the mold clamping device is applied to a die casting apparatus, which has a large fluctuation of mold temperature, this problematic situation is notably present, and the problem arises where the stability of the molding process is significantly degraded.

In order to solve this problem, the stroke of the mold opening and closing means should be adjusted so that the movable platen is stopped at a position that is immediately before the movable mold comes in contact with the stationary mold and by which the split nut included in the tie bar connecting means can be securely engaged with the engagement portion of the tie bar. According to the mold clamping device disclosed in the Japanese Patent Application Publication No. H8-72113, however, because the piston stroke is regular, if the piston stroke before the mold contact is made shorter in order to put emphasis on the molding cycles (i.e. productivity), the piston stroke at the time when the mold is released (i.e. the mold release stroke) becomes insufficient, and an error will occur in the mold release process. Consequently, there is a constraint that it is necessary to make the piston stroke before the mold contact have a certain length.

DISCLOSURE OF THE INVENTION

In view of the problems of the conventional techniques described above, the present invention aims to provide a mold clamping device and also a molding method using the mold clamping device, by which it is possible to generate a mold clamping force without fail even if the thickness of the mold changes, and also to maintain a sufficient mold release stroke even if the piston stroke before the mold contact is set to be short, and thereby make a significant contribution to improvement of the stability of molding process and improvement of the productivity.

In order to solve the problems, the present invention provides a mold clamping device including: a stationary platen that supports a stationary mold; a movable platen that supports a movable mold; a plurality of tie bars with ends that are detachably connected to the stationary platen and with other ends that extend through the movable platen; mold opening and closing means that moves the movable platen toward and away from the stationary platen so that the movable mold opens from and closes on the stationary mold; tie bar connecting means that detachably connects each of the plurality of tie bars to the movable platen by having a split nut engaged with an engagement portion formed in each of the tie bars; and a mold clamping cylinder that is provided around a tie bar insertion through hole in the movable platen and propels the movable platen toward the stationary platen side, using the split nut within the tie bar connecting means as a reaction point, so as to generate a mold clamping force. In the mold clamping device, the mold clamping cylinder includes a secondary piston that defines, out of two chambers in front and in rear defined by a primary piston that abuts against the split nut, the chamber positioned on the stationary platen side into a front chamber and a rear chamber, and the secondary piston integrally operates with the primary piston at a time of a mold contact and a mold clamping, but makes a movement relative to the primary piston at a time of a mold release.

In the mold clamping device having this configuration, the secondary piston, which integrally operates with the primary piston at the time of the mold contact and the mold clamping, makes a movement relative to the primary piston at the time of the mold release. Thus, it is possible to make the piston stroke at the time of the mold release longer than the piston stroke at the time of the mold contact and the mold clamping. In other words, it is possible to set the piston stroke at the time of the mold contact and the mold clamping to be a required minimum. Consequently, even if the split nut within the tie bar connecting means is configured to be engaged with the engagement portion of the tie bar while the condition to keep the movable mold out of contact with the stationary mold is satisfied, the productivity will not be sacrificed.

With the mold clamping device, it is preferable to have a configuration in which the mold opening and closing means stops the movable platen at a position, immediately before the movable mold comes in contact with the stationary mold.

The present invention also provides a molding method using the mold clamping device that includes the mold opening and closing means described above. In the molding method, after the mold opening and closing means moves the movable platen toward the stationary platen side and stops the movable platen at the position, immediately before the movable mold comes in contact with the stationary mold, the split nut within the tie bar connecting means is closed so that each of the plurality of tie bars is connected to the movable platen. The movable platen is then propelled by an operation of the mold clamping cylinder so that the mold contact and the mold clamping are performed. When a predetermined period of cooling time has passed after completion of an injection process, a supply-discharge mode for pressure oil to and from the mold clamping cylinder is changed so that the mold release is performed with a piston stroke larger than a piston stroke used at the time of the mold contact and the mold clamping.

BEST MODES FOR CARRYING OUT THE INVENTION

The following describes the best modes for carrying out the present invention, with reference to the accompanied drawings.

Figure 2:
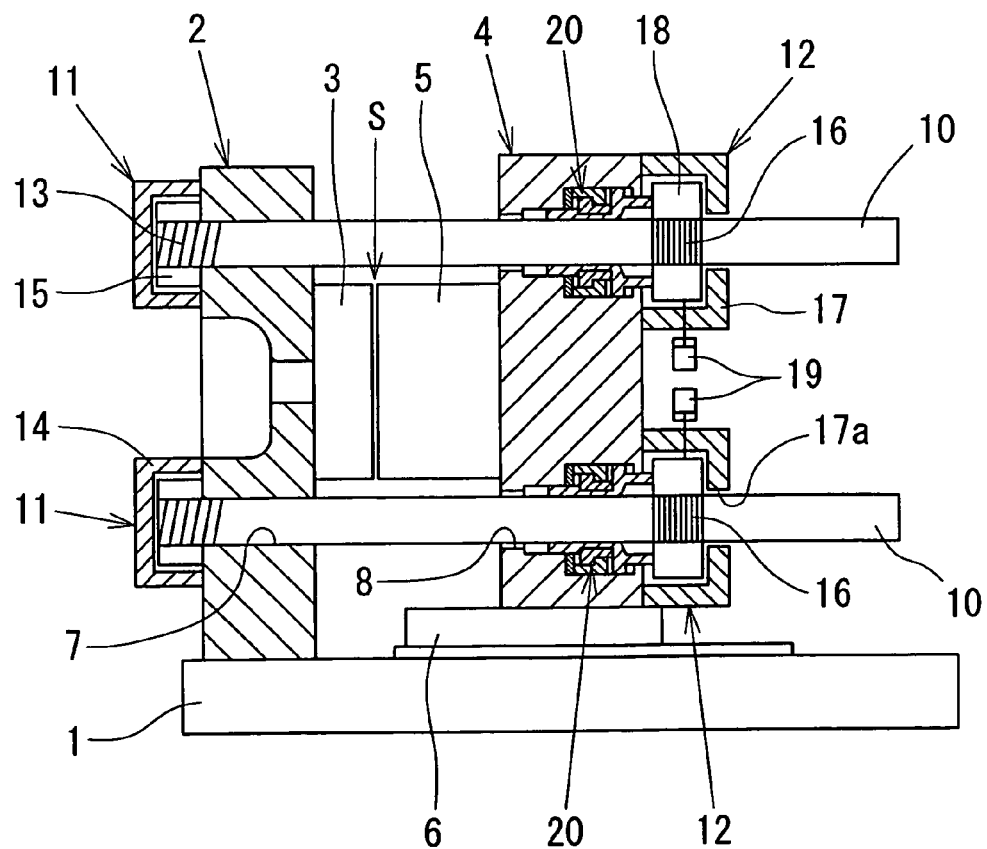
FIG. 2 is a cross sectional view that shows the overall structure of the mold clamping device according to the present invention.

FIG. 2 shows the overall structure of a mold clamping device according to the present invention, applied to a die casting machine. In this drawing, the reference characters denote the following constituent elements respectively—1: a base plate; 2: a stationary platen that supports a stationary mold 3; 4: a movable platen that supports a movable mold 5. The stationary platen 2 is fixed to one end of the base plate 1. The movable platen 3 is disposed on the base plate 1 via a slide shoe 6 and is configured to move toward and away from the stationary platen 2. The movable platen 3 is moved toward and away from the stationary platen 2 by mold opening and closing means, which is not shown in the drawing. In correspondence with the movement of the movable platen 3, the movable mold 5 is positioned at a semi-closed mold position by which there is a small space S between the movable mold 5 and the stationary mold 3, as shown in the drawing, and at an open mold position by which the movable mold 5 is positioned very much away from the stationary mold 3. The mold opening and closing means may be in any form and may be selected from different options such as a hydraulic cylinder, a motor-driven rack and pinion mechanism, a ball-screw mechanism, and the like.

The reference character 10 denotes four tie bars that extend through tie bar insertion through holes 7 and 8 that are formed in the four corners of the stationary platen 2 and the movable platen 4. Four first tie bar connecting devices (connecting means) 11 that detachably connect one end of each of the tie bars 10 to the stationary platen 2 are provided on the back of the stationary platen 2. Four second tie bar connecting devices (connecting means) 12 that detachably connect a middle portion of each of the tie bars 10 to the movable platen 4 are provided on the back of the movable platen 4.

Each of the first tie bar connecting devices 11 on the stationary platen 2 side includes a screw unit 13 formed on the outer circumference of the tie bar 10, a split nut 15 provided inside a box 14 that is saclike and is fixed on the back of the stationary platen 2, and a driving mechanism (not shown in the drawing) that opens and closes the split nut 15. When the split nut 15 is closed by the driving mechanism, the split nut 15 is screwed together with the screw unit 13 of the tie bar 10, and the one end of the tie bar 10 is connected to the stationary platen 2.

Each of the second tie bar connecting devices 12 on the movable platen 4 side includes a multiple groove portion (an engagement portion) 16 formed on the outer circumference of the tie bar 10, a split nut 18 provided inside a box 17 that is fixed on the back of the movable platen 4, and a driving mechanism that opens and closes the split nut 18, using the cylinder 19 as a driving source. The box 17 included in the second tie bar connecting device 12 has a through hole 17a in the bottom face thereof, and the tie bar 10 extends through the through hole 17a. When the molds are in the state of the semi-closed mold position, as shown in FIG. 2, the multiple groove portion 16 of the tie bar 10 is positioned within the box 17. In this state, when the split nut 18 is closed as a result of an operation of the cylinder 19, the split nut 18 is engaged with the multiple groove portion 16 of the tie bar 10. Consequently, the tie bar 10 is connected to the movable platen 4. The split nut 18 is configured to be able to make a small relative movement in the direction in which the tie bar 10 extends. Accordingly, even if the split nut 18 is engaged with the multiple groove portion 16 of the tie bar 10, the movable platen 4 is able to move a little toward the stationary platen 2 side.

On the other hand, a mold clamping cylinder 20 is provided at such a position that is inside each of the tie bar insertion through holes 8 in the movable platen 4 and is away from the stationary platen 2. In the following description, the side away from the stationary platen 2 is referred to as the rear side, whereas the side facing the stationary platen 2 is referred to as the front side.

Figure 1:
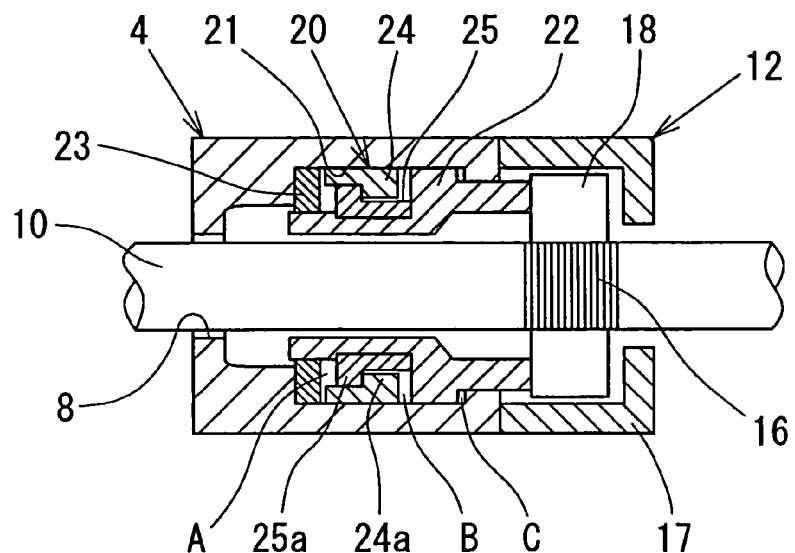
FIG. 1 is a cross sectional view that shows the structure of a mold clamping cylinder included in a mold clamping device according to the present invention.

As clearly shown in FIG. 1, the mold clamping cylinder 20 includes a primary piston 22 that is slidably provided in a cylinder unit 21 formed around the tie bar insertion through hole 8 in the movable platen 4 and is in the shape of a stepped ring. The tie bar 10 extends through the inside of the primary piston 22. The rear end of the primary piston 22 abuts against the split nut 18 within the second tie bar connecting device 12, whereas the front end of the primary piston 22 is slidably inserted in a ring stopper 23 provided on the front wall side within the cylinder unit 21.

The mold clamping cylinder 20 also includes a secondary piston 24 that is in the shape of a ring and is slidably provided in a front chamber, out of the two chambers, namely, the front chamber and a rear chamber, that are defined within the cylinder unit 21 by the primary piston 22. The secondary piston 24 slides as being guided by an outward flange 25a provided on the front end portion of a ring guide 25 that is exteriorly fitted and fixed to the primary piston 22 and the inner circumferential surface of the cylinder unit 21. Also, the forward movement of the secondary piston 24 toward the primary piston 22 is regulated because of an arrangement in which an inward flange 24a on the rear end portion of the secondary piston 24 abuts against the outward flange 25a on the ring guide 25 from the back side thereof.

To be more specific, within the cylinder unit 21 of the above described mold clamping cylinder 20, the oil chambers A, B, and C are defined by the ring stopper 23, the secondary piston 24, and the ring guide 25; by the secondary piston 24 and the primary piston 22; and by the primary piston 22 and the real wall of the cylinder unit 21, respectively. To and from each of the three oil chambers A, B, and C, pressure oil is independently supplied and discharged by a hydraulic circuit, which is not shown in the drawing.

Next, the action of the mold clamping device that is configured as described above will be explained with reference to FIG. 3. For the sake of convenience of the explanation, the illustration of the second tie bar connecting device 12 is represented only by the split nut 18 in FIG. 3.

Figure 3:
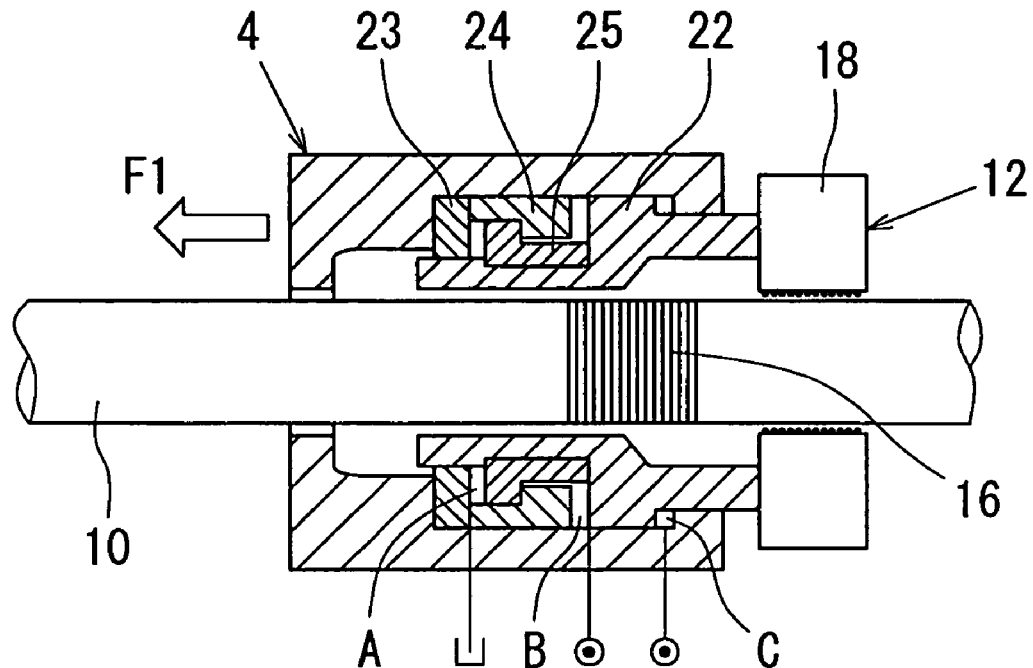
FIG. 3 (1) to (5) are cross sectional views that show a sequence of the operational states of the mold clamping cylinder during a molding process in which the mold clamping device of the present invention is used.
Figure 3:
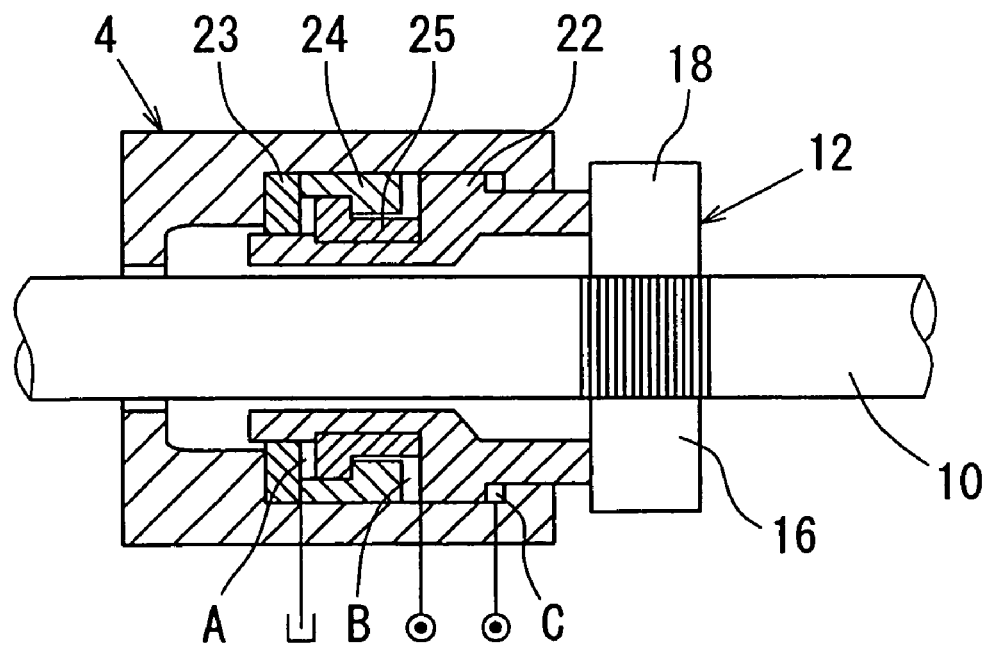
Figure 3:
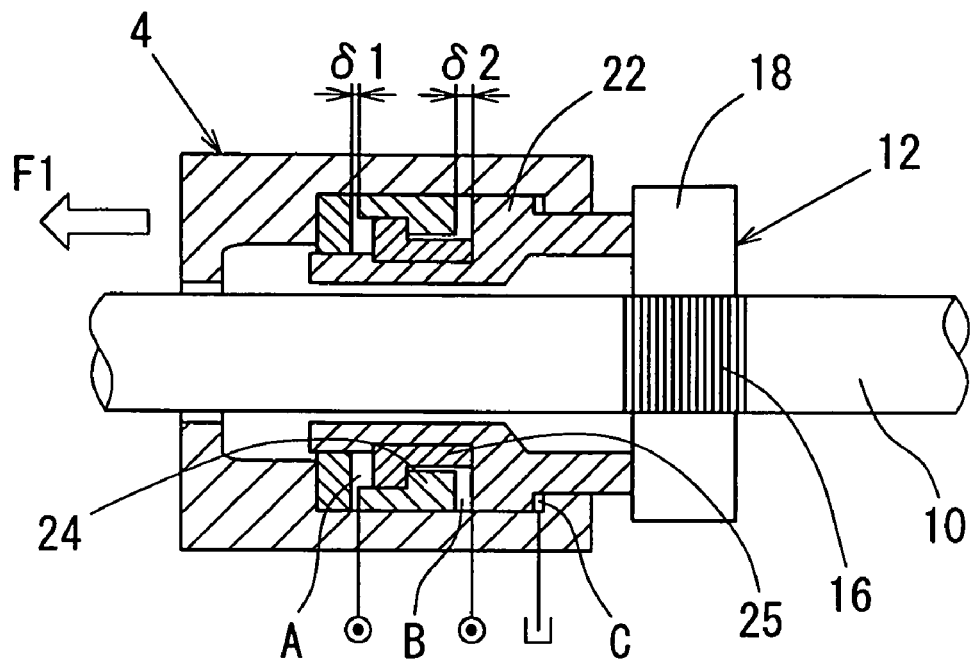
Figure 3:
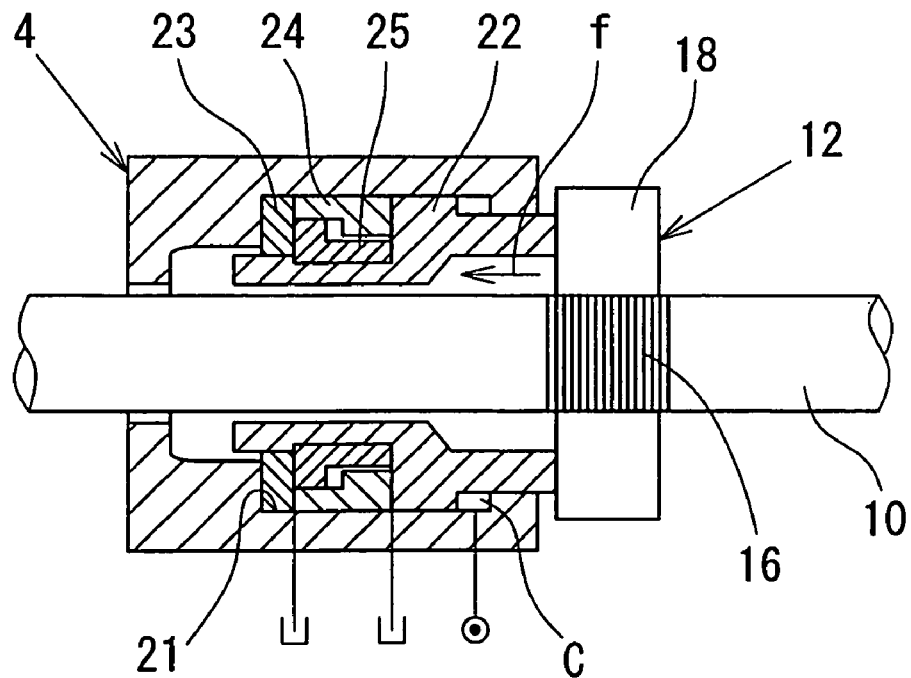
Figure 3:
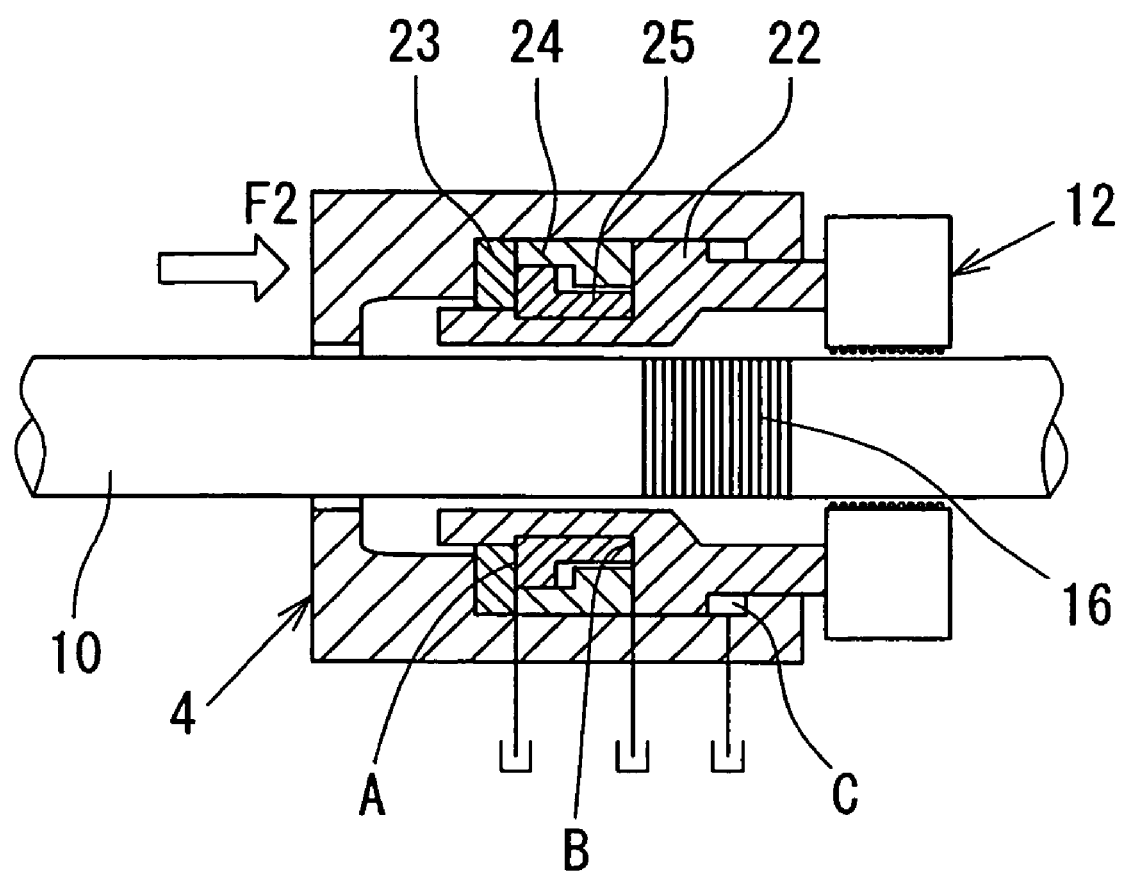

When a die cast process is started, the movable platen 4 is positioned at the open mold position. The split nut 18 within the second tie bar connecting device 12 on the movable platen 4 side is at an opening position, as shown in FIG. 3 (1), so that the connection of the tie bar 10 to the movable platen 4 is released. As for the mold clamping cylinder 20, the oil chamber A on the front side is connected to a tank, while pressure oil is supplied to the oil chamber B in the middle and to the oil chamber C on the rear side. With this configuration, the secondary piston 24 is positioned in such a manner that the front end of the secondary piston 24 abuts against the ring guide 23. The primary piston 22 is positioned at a neutral position so that the oil pressure in the oil chamber B is balanced with the oil pressure in the oil chamber C.

Then, first of all, the mold opening and closing means (not shown in the drawing) operates so that, as shown with the arrow F1 in FIG. 3 (1), the movable platen 4 moves forward toward the stationary platen 2 by a predetermined distance. As a result, as shown in FIG. 2, a semi-closing process of the molds is performed after which there is only a small space S (for example, approximately 5 millimeters) between the movable mold 5 and the stationary mold 3.

When the semi-closing process of the molds is completed, the cylinder 19 in the second tie bar connecting device 12 operates so that the split nut 18 in the second tie bar connecting device 12 is closed. At this time, the movable platen 4 is positioned so as to allow the split nut 18 to be securely engaged with the multiple groove portion 16 of the tie bar 10. Accordingly, as shown in FIG. 3 (2), the split nut 18 is engaged with the multiple groove portion 16 of the tie bar 10, thereby connecting the tie bar 10 to the movable platen 4.

Then, the oil chamber C on the rear side within the mold clamping cylinder 20 is connected to the tank, and also pressure oil is supplied to the oil chamber A on the front side. Consequently, as shown in FIG. 3 (3), the primary piston 22 in the mold clamping cylinder 20 is pressed with pressure by the split nut 18 in the second tie bar connecting device 12. At this time, the supply of the pressure oil to the oil chamber B in the middle is still continued, and thus the relative positions between the primary piston 22 and the secondary piston 24 do not change. Accordingly, because of the reaction force due to the primary piston 22 pressed by the split nut 18, the movable platen 4 moves forward toward the stationary platen 2 side, as shown with the arrow F1. As a result, the space S (FIG. 2) between the movable mold 5 and the stationary mold 3 has now disappeared, and thus these two molds are in contact with each other. The supply of the pressure oil to the pressure chamber A is still continued even after the molds have come in contact with each other. Consequently, the movable platen 4 is further propelled, using the split nut 18 as a reaction point, whereby a large mold clamping force is generated at a portion where the stationary mold 3 meets the movable mold 5. In FIG. 3 (3), the symbol $\delta 1$ denotes a piston stroke at the time of the mold contact and the mold clamping.

When the mold clamping process is completed, liquid metal is poured into a cavity formed between the stationary mold 3 and the movable mold 5 from an injection mechanism (not shown in the drawing) provided on the stationary platen 2 so that a casting process is performed. When the casting process is completed, firstly, as shown in FIG. 3 (4), the oil chamber A on the front side and the oil chamber B in the middle that are provided inside the mold clamping cylinder 20 are connected to the tank, and at the same time, pressure oil is supplied to the oil chamber C on the rear side. As a result, the primary piston 22 moves toward the front side as shown with the arrow f, and the secondary piston 24, which makes a relative movement, moves toward the rear side. Consequently, the front end of the secondary piston 24 abuts against the ring stopper 23, and the rear end of the secondary piston 24 abuts against the stepped portion of the primary piston 22. At this time, the supply of the pressure oil to the oil chamber C on the rear side is still continued, and thereby the stationary platen 4 moves backwards and the cast product in the mold is released from the mold. In this situation, the mold release stroke is a value obtained by adding the piston stroke $\delta 1$ at the time of the mold contact and the mold clamping shown in FIG. 3 (3) to the piston stroke $\delta 2$ of the primary piston 22, i.e. $\delta 1 + \delta 2$. This value (for example, approximately 20 millimeters) is considerably larger than the piston stroke $\delta 1$ at the time of the mold contact and the mold clamping. In other words, even if the piston stroke $\delta 1$ at the time of the mold contact and the mold clamping is set to be a required minimum, it is possible to maintain a mold release stroke that is sufficiently large.

After the mold releasing process is completed, as shown in FIG. 3 (5), the oil chamber C on the rear side within the mold clamping cylinder 20 is connected to the tank, and at the same time, the split nut 18 is opened as a result of an operation of the cylinder 19 in the second tie bar connecting device 12. Consequently, the connection of the tie bar 10 to the movable platen 4 is released. Then, the mold opening and closing means, which is not shown in the drawing, operates so that the movable platen 4 moves backward away from the stationary platen 2, as shown with the arrow F2. Thus, the movable mold 5 opens up from the stationary mold 3. After the mold opening process is finished, a cast product that is stuck to the movable mold 5 is taken out of the mold by a pushing mechanism that is built in the movable mold 5 and forwarded to a work carrying means, which is not shown in the drawing. On the other hand, the supply of pressure oil to the oil chamber A on the front side within the mold clamping cylinder 20 is resumed at this stage, so that the primary piston 22 and the secondary piston 24 return to their original positions shown in FIG. 3 (1). Thus, one cycle of the die casting process is completed.

In this situation, if the molds 3 and 5 need to be replaced, the split nuts 18 in the second tie bar connecting devices 12 on the upper side are closed in the semi-closed mold position state shown in FIG. 2. While the two tie bars 10 on the upper side are connected to the movable platen 4, the split nuts 15 in the first tie bar connecting devices 11 are opened so that the connection of the two tie bars 10 on the upper side to the stationary platen 2 is released. Then, the mold opening and closing means, which is not shown in the drawing, is operated. As a result, the movable platen 4 moves backward away from the stationary platen 2, and the two tie bars 10 on the upper side follow this movement so as to come out of the stationary platen 2. Thus, the stationary platen 2 and the movable platen 4 become widely apart from each other. Accordingly, it is possible to replace the stationary mold 3 and the movable mold 5 without having the tie bars 10 on the upper side in the way. As additional information, in the case where the replacement of the molds is performed from the side, the two tie bars on the lower side are to be removed. In such a case, the procedure described above is conducted on the lower side, instead of the upper side.

INDUSTRIAL APPLICABILITY

With the mold clamping device according to the present invention, it is possible not only to have the split nut within the tie bar connecting means securely engaged with the engagement portion of the tie bar while the condition to keep the movable mold out of contact with the stationary mold is satisfied, but also to set the piston stroke at the time of the mold contact and the mold clamping to be a required minimum. Thus, it is possible to improve the stability of the molding process and to improve the productivity. Further, because the fiction to allow the tie bars to be removed from the stationary platen is maintained, it is possible to have high efficiency in the mold changing process. Accordingly, utilization of the present invention has a high potential value.

Also, with the molding method according to the present invention, the tie bar connecting means is operated at a predetermined position immediately before the movable mold comes in contact with the stationary mold. Therefore, it is possible to have the tie bars securely connected to the movable platen, as well as achieve stability and efficiency in the molding process.

The invention claimed is:

1. A mold clamping device comprising:
   a stationary platen that supports a stationary mold;
   a movable platen that supports a movable mold;
   a plurality of tie bars with ends that are detachably connected to the stationary platen and other ends that extend through the movable platen;
   mold opening and closing means that moves the movable platen toward and away from the stationary platen so that the movable mold opens from and closes on the stationary mold;
   tie bar connecting means that detachably connects each of the plurality of tie bars to the movable platen by having a split nut engaged with an engagement portion formed in each of the tie bars; and
   a mold clamping cylinder that is provided around a tie bar insertion through hole in the movable platen and propels the movable platen toward the stationary platen side, using the split nut in the tie bar connecting means as a reaction point, so as to generate a mold clamping force, wherein
   the mold clamping cylinder includes a secondary piston that defines, out of two chambers in front and in rear defined by a primary piston that abuts against the split nut, the chamber positioned on the stationary platen side into a front chamber and a rear chamber, and
   the secondary piston integrally operates with the primary piston at a time of a mold contact and a mold clamping, but makes a movement relative to the primary piston at a time of a mold release.

2. The mold clamping device according to claim 1, wherein
   the mold opening and closing means stops the movable platen at a position, immediately before the movable mold comes in contact with the stationary mold.

3. A molding method using the mold clamping device according to claim 2, wherein
   after the mold opening and closing means moves the movable platen toward the stationary platen side and stops the movable platen at the position, immediately before the movable mold comes in contact with the stationary mold, the split nut in the tie bar connecting means is closed so that each of the plurality of tie bars is connected to the movable platen,
   the movable platen is then propelled by an operation of the mold clamping cylinder so that the mold contact and the mold clamping are performed, and
   when a predetermined period of cooling time has passed after completion of an injection process, a supply-discharge mode for pressure oil to and from the mold clamping cylinder is changed so that the mold release is performed with a piston stroke larger than a piston stroke used at the time of the mold contact and the mold clamping.

* * * * *